(12) United States Patent
Solecki

(10) Patent No.: US 7,796,301 B2
(45) Date of Patent: Sep. 14, 2010

(54) METHOD OF SUPER IMAGE RESOLUTION

(75) Inventor: Larry John Solecki, Woodland Park, CO (US)

(73) Assignee: Solectronics, LLC, Woodland Park, CO (US)

( * ) Notice: Subject to any disclaimer, the term of this patent is extended or adjusted under 35 U.S.C. 154(b) by 668 days.

(21) Appl. No.: 11/803,884

(22) Filed: May 16, 2007

(65) Prior Publication Data

US 2007/0222782 A1    Sep. 27, 2007

Related U.S. Application Data

(63) Continuation of application No. 10/167,176, filed on Jun. 10, 2002, now Pat. No. 7,239,428.

(51) Int. Cl.
*H04N 1/40* (2006.01)
*G06T 3/40* (2006.01)

(52) U.S. Cl. .................. 358/3.01; 358/1.2; 358/299; 358/300

(58) Field of Classification Search ................. 382/299, 382/300; 348/262, 264; 358/1.2, 1.1, 3.01, 358/3.21, 3.24
See application file for complete search history.

(56) References Cited

U.S. PATENT DOCUMENTS

| | | | |
|---|---|---|---|
| 5,414,465 A | 5/1995 | Kodama et al. | |
| 5,767,987 A | 6/1998 | Wolff et al. | |
| 6,377,707 B1 | 4/2002 | Hisamatsu | |
| 6,459,823 B2 | 10/2002 | Altunbasak et al. | |

*Primary Examiner*—Thomas D Lee
(74) *Attorney, Agent, or Firm*—Raggio & Dinnin, P.C.

(57) ABSTRACT

A method of improving resolution for an image is disclosed. The method for improving resolution of an image includes loading a first image and creating a first super grid image based on the first image. The method also includes loading a second image and creating a second super grid image based on the second image. The method then arranges the first super grid image and a second super grid image into an unprocessed super grid image having a checkerboard like pattern. Next the method calculates a pixel value from at least two pixel values of the unprocessed super grid image. Then the method will insert pixels into a super resolution image and display that super resolution image on a display.

36 Claims, 7 Drawing Sheets

|     |     |     |     |     |     |     |     |
|-----|-----|-----|-----|-----|-----|-----|-----|
| h11 | h12 | h13 | h14 | h15 | h16 | h17 | h18 |
| h21 | h22 | h23 | h24 | h25 | h26 | h27 | h28 |
| h31 | h32 | h33 | h34 | h35 | h36 | h37 | h38 |
| h41 | h42 | h43 | h44 | h45 | h46 | h47 | h48 |
| h51 | h52 | h53 | h54 | h55 | h56 | h57 | h58 |
| h61 | h62 | h63 | h64 | h65 | h66 | h67 | h68 |
| h71 | h72 | h73 | h74 | h75 | h76 | h77 | h78 |
| h81 | h82 | h83 | h84 | h85 | h86 | h87 | h88 |

FIG. 3.

|     |     |     |     |     |     |     |     |
|-----|-----|-----|-----|-----|-----|-----|-----|
| i11 | i12 | i13 | i14 | i15 | i16 | i17 | i18 |
| i21 | i22 | i23 | i24 | i25 | i26 | i27 | i28 |
| i31 | i32 | i33 | i34 | i35 | i36 | i37 | i38 |
| i41 | i42 | i43 | i44 | i45 | i46 | i47 | i48 |
| i51 | i52 | i53 | i54 | i55 | i56 | i57 | i58 |
| i61 | i62 | i63 | i64 | i65 | i66 | i67 | i68 |
| i71 | i72 | i73 | i74 | i75 | i76 | i77 | i78 |
| i81 | i82 | i83 | i84 | i85 | i86 | i87 | i88 |

FIG. 4.

| | | | | | | | | | | | | | | | | |
|---|---|---|---|---|---|---|---|---|---|---|---|---|---|---|---|---|
| h11 | | h12 | | h13 | | h14 | | h15 | | h16 | | h17 | | h18 | | |
| | i11 | | i12 | | i13 | | i14 | | i15 | | i16 | | i17 | | i18 |
| h21 | | h22 | | h23 | | h24 | | h25 | | h26 | | h27 | | h28 | | |
| | i21 | | i22 | | i23 | | i24 | | i25 | | i26 | | i27 | | i28 |
| h31 | | h32 | | h33 | | h34 | | h35 | | h36 | | h37 | | h38 | | |
| | i31 | | i32 | | i33 | | i34 | | i35 | | i36 | | i37 | | i38 |
| h41 | | h42 | | h43 | | h44 | | h45 | | h46 | | h47 | | h48 | | |
| | i41 | | i42 | | i43 | | i44 | | i45 | | i46 | | i47 | | i48 |
| h51 | | h52 | | h53 | | h54 | | h55 | | h56 | | h57 | | h58 | | |
| | i51 | | i52 | | i53 | | i54 | | i55 | | i56 | | i57 | | i58 |
| h61 | | h62 | | h63 | | h64 | | h65 | | h66 | | h67 | | h68 | | |
| | i61 | | i62 | | i63 | | i64 | | i65 | | i66 | | i67 | | i68 |
| h71 | | h72 | | h73 | | h74 | | h75 | | h76 | | h77 | | h78 | | |
| | i71 | | i72 | | i73 | | i74 | | i75 | | i76 | | i77 | | i78 |
| h81 | | h82 | | h83 | | h84 | | h85 | | h86 | | h87 | | h88 | | |
| | i81 | | i82 | | i83 | | i84 | | i85 | | i86 | | i87 | | i88 |

| h11 | j00 | h12 | j01 | h13 | j02 | h14 | j03 | h15 | j04 | h16 | j05 | h17 | j06 | h18 | j07 |
|---|---|---|---|---|---|---|---|---|---|---|---|---|---|---|---|
| j10 | i11 | j11 | i12 | j12 | i13 | j13 | i14 | j14 | i15 | j15 | i16 | j16 | i17 | j17 | i18 |
| h21 | j20 | h22 | j21 | h23 | j22 | h24 | j23 | h25 | j24 | h26 | j25 | h27 | j26 | h28 | j27 |
| j30 | i21 | j31 | i22 | j32 | i23 | j33 | i24 | j34 | i25 | j35 | i26 | j36 | i27 | j37 | i28 |
| h31 | j40 | h32 | j41 | h33 | j42 | h34 | j43 | h35 | j44 | h36 | j45 | h37 | j46 | h38 | j47 |
| j50 | i31 | j51 | i32 | j52 | i33 | j53 | i34 | j54 | i35 | j55 | i36 | j56 | i37 | j57 | i38 |
| h41 | j60 | h42 | j61 | h43 | j62 | h44 | j63 | h45 | j64 | h46 | j65 | h47 | j66 | h48 | j67 |
| j70 | i41 | j71 | i42 | j72 | i43 | j73 | i44 | j74 | i45 | j75 | i46 | j76 | i47 | j77 | i48 |
| h51 | j80 | h52 | j81 | h53 | j82 | h54 | j83 | h55 | j84 | h56 | j85 | h57 | j86 | h58 | j87 |
| j90 | i51 | j91 | i52 | j92 | i53 | j93 | i54 | j94 | i55 | j95 | i56 | j96 | i57 | j97 | i58 |
| h61 | j100 | h62 | j101 | h63 | j102 | h64 | j103 | h65 | j104 | h66 | j105 | h67 | j106 | h68 | j107 |
| j110 | i61 | j111 | i62 | j112 | i63 | j113 | i64 | j114 | i65 | j115 | i66 | j116 | i67 | j117 | i68 |
| h71 | j120 | h72 | j121 | h73 | j122 | h74 | j123 | h75 | j124 | h76 | j125 | h77 | j126 | h78 | j127 |
| j130 | i71 | j131 | i72 | j132 | i73 | j133 | i74 | j134 | i75 | j135 | i76 | j136 | i77 | j137 | i78 |
| h81 | j140 | h82 | j141 | h83 | j142 | h84 | j143 | h85 | j144 | h86 | j145 | h87 | j146 | h88 | j147 |
| j150 | i81 | j151 | i82 | j152 | i83 | j153 | i84 | j154 | i85 | j155 | i86 | j156 | i87 | j157 | i88 |

METHOD OF SUPER IMAGE RESOLUTION

This application is a continuation of application Ser. No. 10/167,176, filed Jun. 10, 2002 now U.S. Pat. No. 7,239,428.

BACKGROUND OF THE INVENTION

1. Field of the Invention

The present invention generally relates to image processing, and more particularly, relates to a super image resolution processing technique by which two or more digitized images are used to create a new image with superior resolution.

2. Description of Related Art

Image processing and image processing techniques have been known for many years. Images can be manipulated by computers or other electronic devices to increase the brightness, contrast, even resolution of any digital image. These image processing systems are used to manipulate photos, and other images found in the electronic world. Many of these conventional image processing systems utilize a two-dimensional prediction scheme for prediction coding of still pictures. Generally speaking in this type of scheme, the value of one pixel on a scanning line is predicted on the basis of the value of the several pixels immediately preceding the one pixel. In this process a predicted error signal is quantized and instead of the quantized value of the predicted error itself, a quantized number corresponding to the quantized value of the predicted error is transmitted after being subjected to variable-length coding. Generally, in prior art two-dimensional systems still picture data is obtained by scanning and storing in a frame buffer in the format of compressed still picture data, the pixel data for the first pixel on each line is stored in the frame buffer as an uncoded true value.

In other prior art modem digital imaging techniques, analog video signals are sampled and stored as digital data for subsequent reproduction on a cathode ray tube or other display. These imaging techniques display such images with as high resolution as possible and as little distortion as possible. Generally, these cathode ray tubes use a fluorescent screen that are irradiated by three electron beams to illuminate respective blue, green and red phosphors distributed in small units on the screen. The displayed image is considered a congregation of such points, i.e. pixels. Therefore, in the prior art there are many different ways of image processing with the use of computers.

Prior art image resolution systems image quality is affected by distance, the orientation of the object to the camera, the environmental conditions, and the quality of the camera taking the initial image. Very often it is impractical to overcome these problems with a better camera, a better vantage point or changes in conditions. Therefore, the use of image processing software is used to make a final image of higher quality based on source images of the same object. The prior art has shown solutions for both spatial and gray scale resolution to show favorable improvement. Generally, any set of digitized images of generally the same area can be processed. However, prior art techniques do show drawbacks and limitations. Most of the current prior art image processing techniques use codes that are not optimized for speed and generally do not perform a satisfactory image resolution on an image, with respect to the contrast and detail necessary for consumers and computer users.

Furthermore, other prior art methods such as JPEG and MPEG coding are used as compression modules to compress images to reduce the size of an image to allow for easier transfer of a file across wireless or wire a network. The use of prior art resolution techniques is generally used separately and independent from the MPEG and JPEG compression methods.

Therefore, there is a need in the art for an improved image resolution technique that will enhance the resolution of an image in a shorter time while also vastly improving the resolution of two or more digitized images.

SUMMARY OF THE INVENTION

One object of the present invention is to provide an improved image processing method.

Another object of the present invention is to provide a new super image resolution method for use in a computer or other electronic device.

Yet a further object of the present invention is to provide a super image resolution method that increases the speed of the processing method.

Still a further object of the present invention is to provide a method, which is capable of taking two or more digitized images to create a new image with superior resolution.

Still another object of the present invention is to provide a method that is independent of digital format and can be applied to color, gray scale, sepia and/or other color monochrome scheme images.

Yet another object of the present invention is to provide an algorithm that does not require the same size or content of images to perform the necessary operation.

Still another object of the present invention is to provide a method that is capable of being recombined into video or time based applications.

To achieve the foregoing objects, a method for improving the resolution of an image includes the steps of loading a first image and creating a first super grid image of the first image. The method then loads the second image and creates a second super grid image of the second image. The method will arrange the first super grid image and the second super grid image into an unprocessed super grid image. Then the method will calculate pixel values from at least two pixel values of the unprocessed super grid image. The method will then insert the calculated pixel values into the super resolution image and finally display the super resolution image on any known display terminal.

One advantage of the present invention is that the method includes an improved and faster image processing method.

A further advantage of the present invention is that the method is capable of being used independent of digital format.

Still another advantage of the present invention is that the method can be applied to color, gray scale, sepia, and all other color or monochrome scheme images.

Still a further advantage of the present invention is that the content and size of the images are not required to be the same.

Yet a further advantage of the present invention is that the processed images may be recombined into video based on time or any other known pattern.

Still a further advantage of the present invention is that the method can be combined with other known compression methods to increase the quality of video and/or images being sent electronically.

Still another advantage of the present invention is that the digital images may be from any source.

Other objects, features, and advantages of the present invention will become apparent from the subsequent description and the appended claims, taken in conjunction with the accompanying drawings.

BRIEF DESCRIPTION OF THE DRAWINGS

FIG. 3 shows a first source image.

FIG. 4 shows a second source image.

FIG. 5 shows an unprocessed super grid image according to the present invention.

DESCRIPTION OF THE EMBODIMENT(S)

Figure 1:
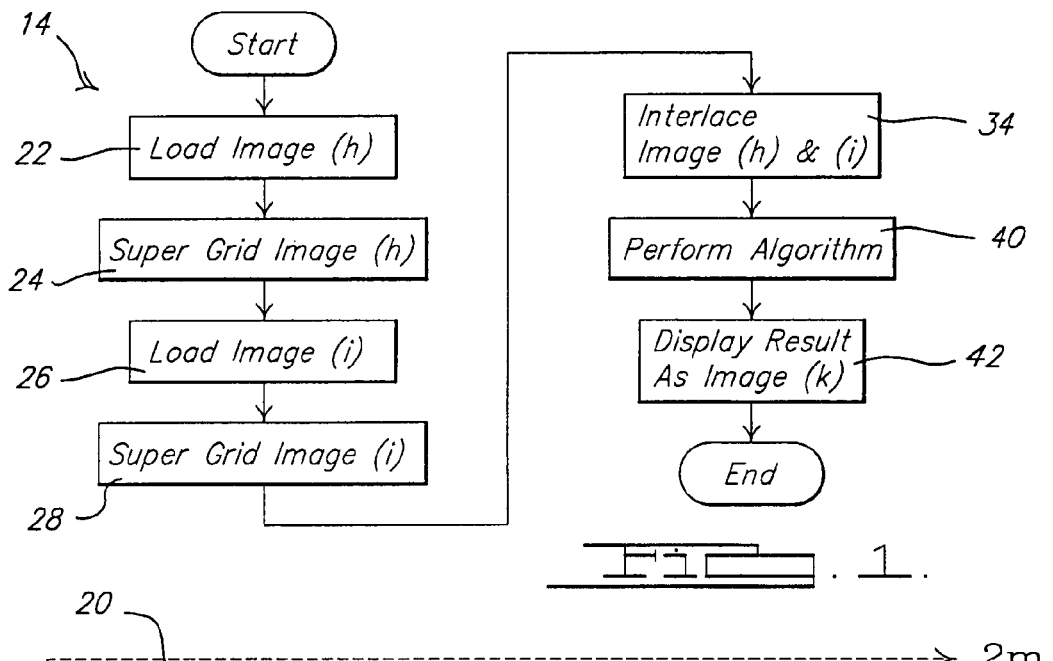
FIG. 1 shows flow chart for the image resolution method according to the present invention.
Figure 2:
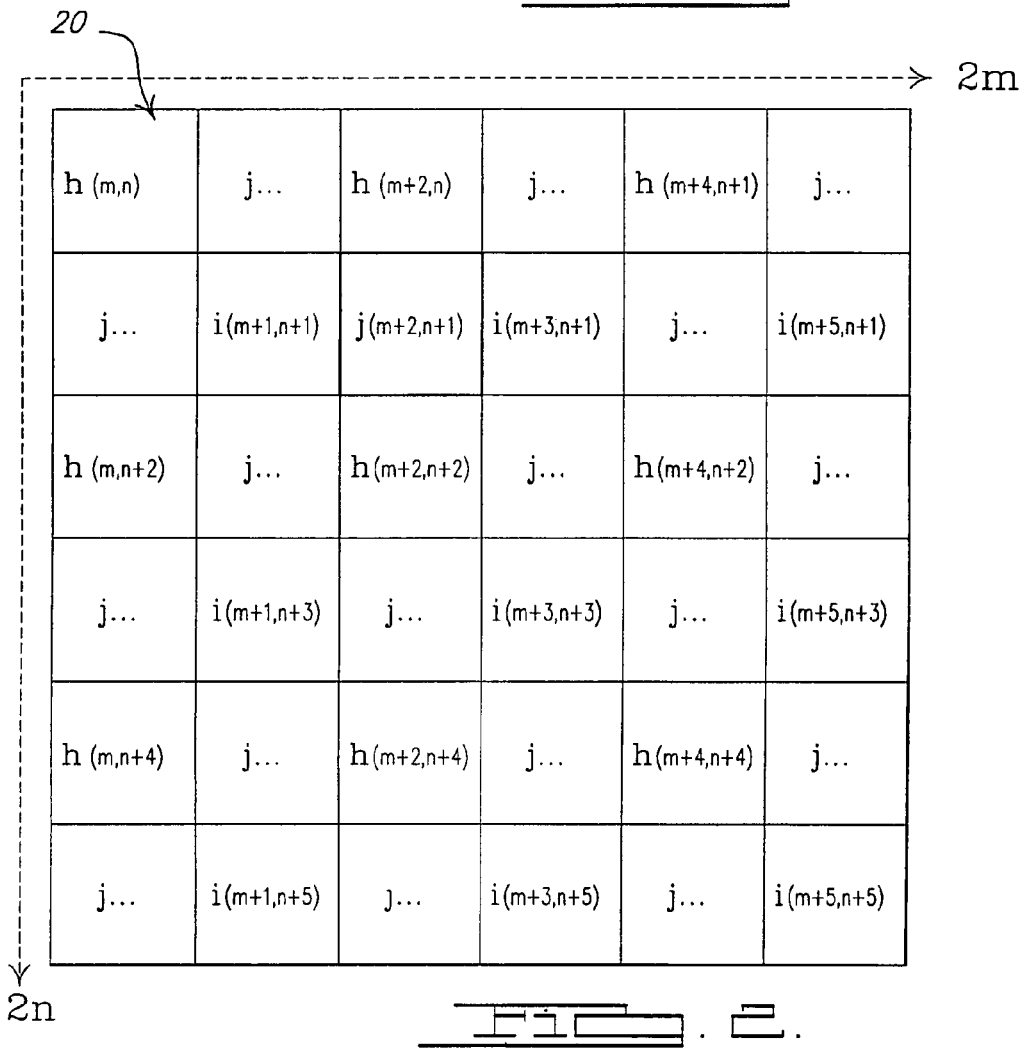
FIG. 2 shows an m×n video image according to the present invention.

Referring to the drawings, a method for super image resolution according to the present invention is shown. It should be noted that the super image resolution method 14 may be used on any type of electronic device and/or computer controlled device, such as a personal computer 12, server, client server, personal digital assistant or any other hand held device, mobile phones, video cameras, digital cameras, televisions, and any other type of electronic device that uses image processing or displays images of any type. Furthermore, a computer chip can be directly programmed/burned via its ROM with the necessary image processing method and allow any small hand held device, television, video cassette recorder or DVD, etc., to perform the super image resolution method, according to the present invention. The super image resolution method 14 is an image processing method by which two or more digitized images 16, 18 are used to create a new image 20 with superior resolution. This method is independent of digital format and can be applied to color, gray scale, sepia and all other color and monochrome scheme images. The images may be of any type such as those scanned in or any other method of creating a digitized image even those based on converting analog images to digitized format.

FIG. 1 shows a flow chart for the overall function of the super image resolution method 14. The overall method includes the first step of loading a first image 16 in block 22. The first image 16 is loaded into the proper register or address of the memory of a computer or micro chip. The first image 16 can have any size however in this embodiment the first image 16 is m×n pixels. Next the method converts the first image 16 into a first super grid image in block 24. Then a second image 18, having size m×n pixels in this embodiment, is loaded into the proper register or memory address of the computer or other device in block 26. The second image 18 then is converted into a second super grid image in block 28 having the same properties as that of the first super grid image. Generally, the first and second super grid image will have a blank or zero value pixel 30 inserted between each and every pixel value of each of the first and second images 16, 18. This will create a repeating pattern for each of the super grid images including a pixel followed by a blank pixel and then another pixel, etc.

The method then in block 34 takes the first super grid image and the second super grid image and interlaces them into one unprocessed super grid image 32 as shown in FIG. 5. In this embodiment the unprocessed super grid image 32 has the overall image pixel size of 2m×2n. As shown in FIG. 5 you can see the blank or zero value pixels 30 which have been inserted between each pixel of the first image 16 and between each pixel of the second image 18. The interlacing unprocessed super grid image 32 uses the first row of pixels 36 from the first image 16 in the first row, while the second row of the unprocessed super grid image 32 includes the first row of pixels 38 of the second image source 18 interlaced and started in an alternating manner to create a checkerboard pattern. In essence each pixel of the first image 16 and second image 18 are surrounded by a blank or zero pixel 30. This alternating of one row of pixels from the first image 16 and then one row of pixels from the second image 18 continues in an alternating fashion until the unprocessed super grid image 32 is completely interlaced in the 2m×2n size.

Figure 6:
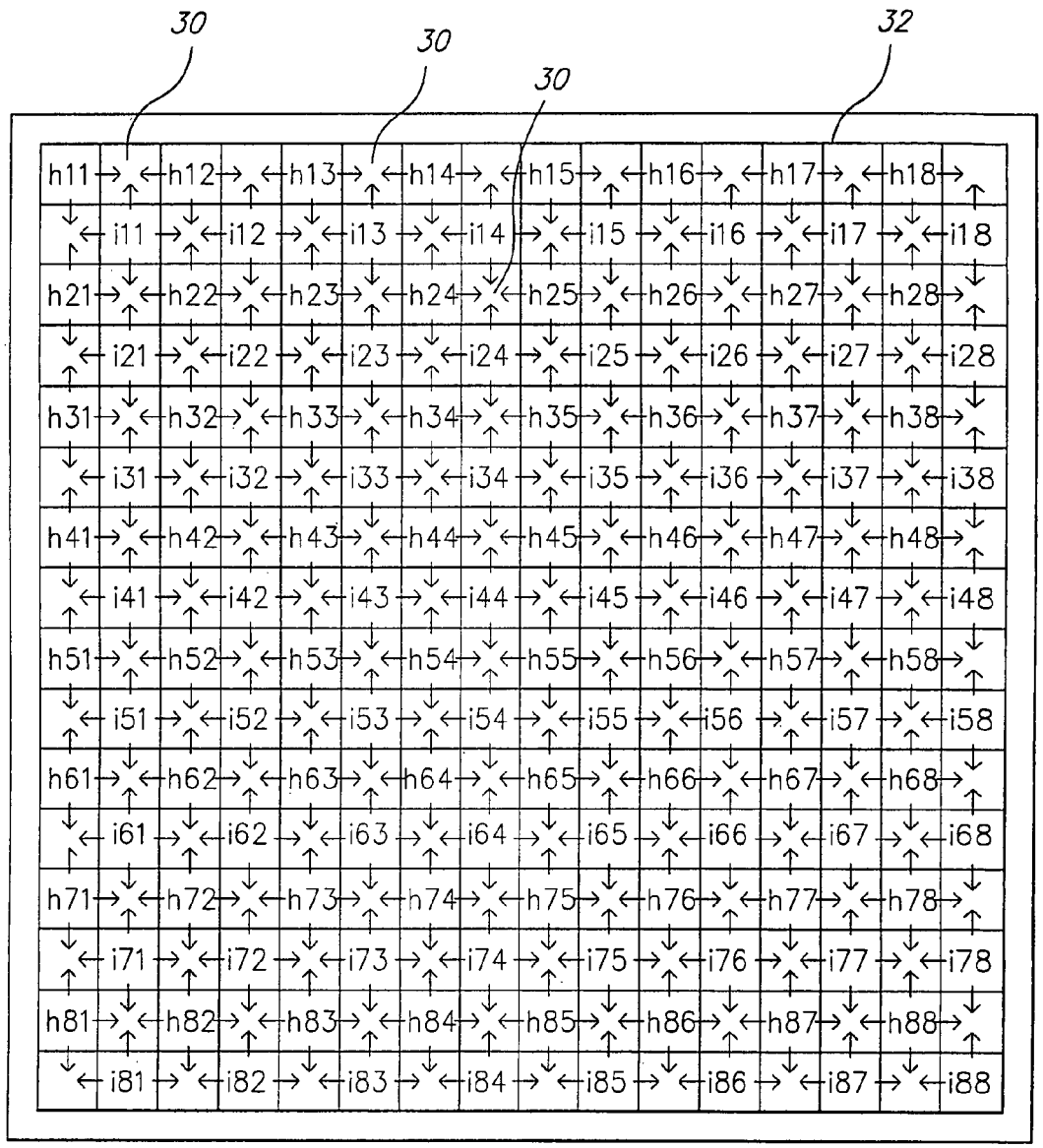
FIG. 6 shows one embodiment of the calculating step in processing the unprocessed super grid image.
Figure 7:
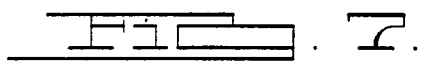
FIG. 7 shows the processed super grid image.

Next the method in block 40 will fill the blank or zero pixels 30 in the unprocessed super grid image 32, as shown in FIG. 6 by any known algorithm. In one embodiment of the present invention the algorithm is based on the contents of the pixels surrounding the blank pixels 30, by any other pixels in one of the two original images, or by an external value. One method according to the present invention uses a bilinear spline algorithm however, it should be noted that other algorithm can also be used such as but not limited to linear, trilinear, bicubic spline, tricubic spline, etc., to calculate values for each blank pixel wherein each pixel is calculated as follows: $j_{(m+1, n+1)} = [(1/4) \times h_{(m+1, n)}] + [(1/4) \times i_{(m, n)}] + [1/4) \times h_{(m+1, n+1)}] + [(1/4) \times i_{(m+1, n+1)}]$. In another embodiment the bilinear spline equation used to calculate the blank pixels 30 in the unprocessed super grip image 32 is as follows: $j_{(m+1, n+1)} = [(1/2) \times (h_{(m+1, n)} + h_{(m+1, n+1)})] + [(1/2) \times (i_{(m,n)} + i_{(m+1, n+1)})]$. In yet another embodiment the following linear algorithm can be used to calculate the blank pixels in the unprocessed super grid image. $j11 = (1/2 \times h12) + (1/2 \times i11) + (1/2 \times i12) + (1/2 \times h22)$. Any of the above identified algorithms or any other algorithm based on surrounding pixels, any other pixels in one of the two original images or by any external value is applied to all remaining blank pixels 30 until the unprocessed super grid 32 is complete. It should be noted that the blank pixels 30 located around the edges of the 2m×2n unprocessed super grid image 32 may not have enough actual pixel values to calculate a precise value for the blank or zero pixels 30. In this case a filling algorithm may be used to import pixel values from the first 16 or second image 18 depending on the need of the computer and processor to substitute such values into the processed super grip image 20 when not enough information is available to calculate a pixel value for a blank pixel 30 based on the algorithm used. Once all the blank pixel values 30 have been calculated the processed super grid image 20 as shown in FIG. 7 is then in block 42 saved and sent, via the proper electronics, for display on a computer screen, PDA screen, video camera, television or any other displaying mechanism.

An example of one embodiment of the super image resolution method 14 according to the present invention can be seen in the following source code example.

```
24 bit pixel structure
typedef struct (
    unsigned char b;
    unsigned char g;
    unsigned char r;
) Pixel 24;
    XPEGEnhanceImage
```

Description:

This function applies to XPEG image enhancement algorithm to a 24-bit RGB image.

Arguments:
    dest    pointer to a location where the resulting image will be stored. Must be four times the size of the input image data.
    source    pointer to a 24-bit RGB image
    cx, cy    dimensions (in pixels) of the source image.
    void XPEGEnhanceImage(void*dest,
                      void*source, unsigned int cx,
                      unsigned int cy)

unsigned int x, y, sum;

Pixel24 * dp = (Pixel24 *)dest;

Pixel24 * sp = (Pixel24 *)source;

Create the "checkerboard" pattern for (y=0; y<cy; y++) for (x=0; x<cx; x++)
    dp [(y*cx*4)+(x*2)] .r=sp [(y*cx)+x] .r;
    dp [(y*cx*4)+(x*2)] .g=sp [(y*cx)+x] .g;
    dp [(y*cx*4)+(x*2)] .b=sp [(y*cx)+x] .b;
    dp [(y*cx*4)+(cx*2)+(x*2)+1].r=sp [(y*cx)+x] .r;
    dp [(y*cx*4)+(cx*2)+(x*2)+1].g=sp [(y*cx)+x] .g;
    dp [(y*cx*4)+(cx*2)+(x*2)+1].b=sp [(y*cx)+x] .b;

The following loops fill in the edges of the image, where averaging cannot accurately be applied.
    for (x=0; x<cx; x++)
    dp [(x*2)+1] .r=sp[x] .r;
    dp [(x*2)+1] .g=sp[x] .g;
    dp [(x*2)+1] .b=sp[x] .b;
    dp [((cy-1)*cx*4)+(cx*2)+(x*2)] .r=sp [((cy-1)*cx)+x] .r;
    dp [((cy-1)*cx*4)+(cx*2)+(x*2)] .g=sp [((cy-1)*cx)+x] .g;
    dp [((cy-1)*cx*4)+(cx*2)+(x*2)] .b=sp [((cy-1)*cx)+x] .b;

for (y=0; y<cy; y++)
    dp [y*cx*4+cx*2] .r=sp[y*cx] .r;
    dp [y*cx*4+cx*2] .g=sp[y*cx] .g;
    dp [y*cx*4+cx*2] .b=sp[y*cx] .b;
    dp [y*cx*4+cx*2-1] .r=sp[y*cx+cx-1] .r;
    dp [y*cx*4+cx*2-1] .g=sp[y*cx+cx-1] .g;
    dp [y*cx*4+cx*2-1] .b=sp[y*cx+cx-1] .b;

This loop fills in the missing pixels in the checkerboard pattern by averaging the values of the four adjacent pixels for (y=1; y<((cy*2)-1); y++)

for (x=2; x<((cx*2)-1); x+=2)
    sum=dp [(y*cx*2)+x-1].r+dp [(y*cx*2)+x+1].r+dp [((y-1)*cx*2)+x].r+dp [((y+1)*cx*2)+x].r;
    sum=sum/4;
    dp [(y*cx*2)+x] .r=(unsigned char) sum;
    sum=dp[(y*cx*2)+x-1] .g+dp[(y*cx*2)+x+1] .g+dp [((y-1)*cx*2)+x].g+dp [((y+1)*cx*2)+x].g;
    sum=sum/4;
    dp [(y*cx*2)+x] .g=(unsigned char) sum;
    sum=dp [(y*cx*2)+x-1] .b+dp [(y*cx*2)+x+1] .b+dp [((y-1)*cx*2)+x].b+dp [((y+1)*cx*2)+x].b;
    sum=sum/4;
    dp [(y*cx*2)+x] .b=(unsigned char) sum;
Y++;
for (x=1; x<((cx*2)-2); x+=2)
    sum=dp [(y*cx*2)+x-1].r+dp [(y*cx*2)+x+1] .r+dp [((y-1)*cx*2)+x].r+dp [((y+1)*cx*2)+x].r;
    sum=sum/4;
    dp [(y*cx*2)+x] .r=(unsigned char) sum;
    sum=dp [(y*cx*2)+x-1] .g+dp [(y*cx*2)+x+1] .g+dp [((y-1)*cx*2)+x].g+dp [((y+1)*cx*2)+x].g;
    sum=sum/4;
    dp [(y*cx*2)+x] .g=(unsigned char) sum;
    sum=dp [(y*cx*2)+x-1] .b+dp [(y*cx*2)+x+1] .b+dp [((y-1)*cx*2)+x].b+dp [((y+1)*cx*2)+x].b;
    sum=sum/4;
    dp [(y*cx*2)+x] .b=(unsigned char) sum as shown in the example of the source code for one embodiment of the present invention a first 16 and second image 18 in this embodiment are the same image. The code transforms the first 16 and second image 18 into a checkerboard pattern unprocessed super grid image 32 as shown in FIG. 5. Then the unprocessed super grid image 32 has the edges of the image filled where the calculating algorithm cannot accurately apply its algorithm to blank pixels 30. Then the missing or blank zero value pixels 30 in the checkerboard unprocessed super grid image 32 are calculated by averaging the values of the four adjacent pixels to each individual blank pixel 30 and assigning and saving that average pixel value to the blank pixel 30, see FIG. 6. The example of code is for a 24-bit pixel structure which as mentioned above uses the same image to create the super image resolution image 20 according to the present invention.

It should be noted that the method according to the present invention does not require that the interlacing of the first 16 and second image 18 has to be complete prior to filling the blank pixels 30 of the unprocessed super grid image 32. The processed super grid image 20 may be formed by a piecemeal, on the fly or any other method of processing. Therefore, the filling of blank pixels 30 may start as soon as the four adjacent pixel values to the blank pixel 30 are known thus increasing the speed of the image processing technique. Furthermore, the order or direction in which the steps of the method are performed does not matter and they can be performed in any of a number of iterations depending on the processing time and processing capabilities available from the microprocessor calculating such values.

Figure 9A:
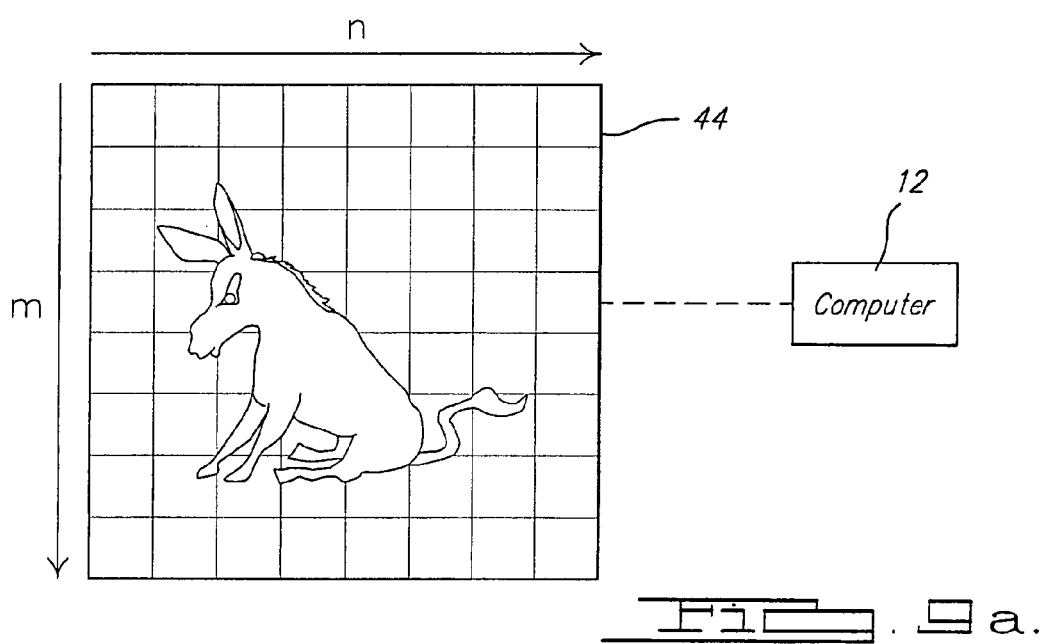
FIGS. 9A and 9B show an alternate embodiment where independent image sources having different sizes and different images are processed by the present invention.
Figure 9B:
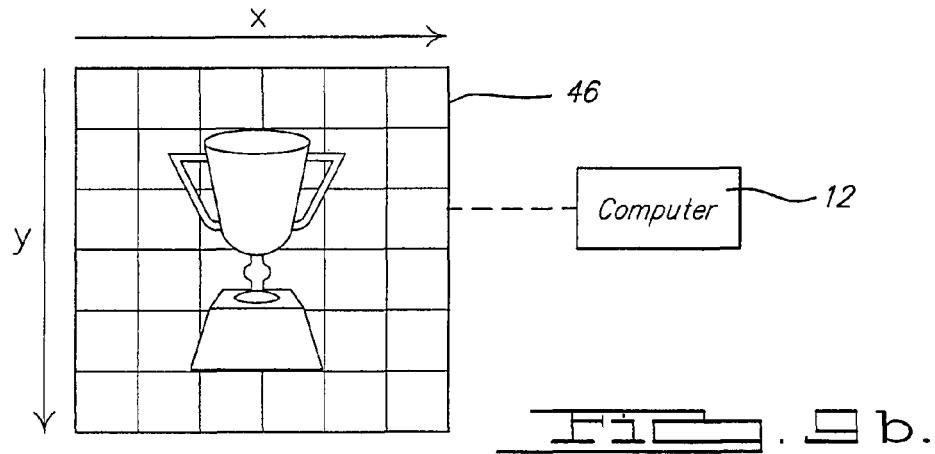

As shown in FIGS. 9A and 9B the content and size of the images which are to be processed do not have to be the same size and the same picture. In this embodiment the first image 44 has size m×n while the second image 46 has the size X×Y. Furthermore, the size and location of interlaced images may also vary to accommodate positioning of smaller images within larger images. This would lead the method to not fill all blank pixels 30 and it is not required that the method fill all blank pixels in the unprocessed super grid image 32. If a first image is one half the size of the second image then once the unprocessed super grid image is interlaced between the first image and second image only those pixels values capable of having the necessary algorithmic calculation performed thereon will be used to fill the blank pixels 30 of the unprocessed super grid image 32. Other blank pixel images may be left blank or can be filled by any known algorithm or sampling method.

The super resolution image method 14 also is capable of adding, filling or omitting blank and zero pixels 30 by any known computer means. These means may be anything such as simple algorithmic calculations, sampling, random placement of pixel values and images, and by filling from the first image or second image into the processed super grid image 20. It should further be noted that the resulting super grid image 20 can also be cropped or reduced in size or enlarged in size as desired depending on the needs and restrictions of the display output memory and output size.

Figure 8:
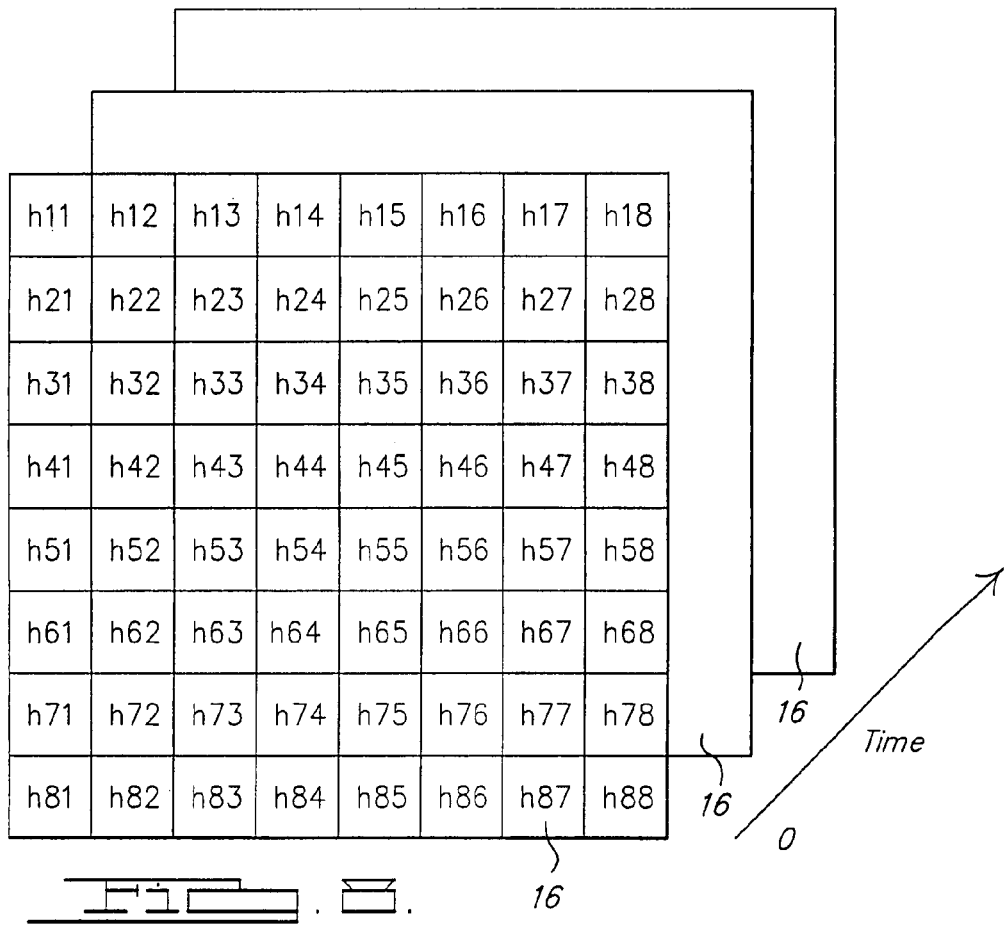
FIG. 8 shows video image sources such as frames or fields for the present invention.

The super image resolution method 14 can derive its images for such method from any source of digital images known. For example but not limited to similar images, dissimilar images, the same image twice, video frames and/or video fields, or other time based video images such as those shown in FIG. 8. Thus, the method can be used in conjunction with a video camera and break down the images of the video into separate frames and apply the method 14 to each separate image or it can take a single digital image and apply the method to such digital image. Any image that has been digitized or can be digitized, including former analog images, can be processed by the super image resolution method 14 thus increasing the resolution of the image in a fast and crisp manner.

Figure 10:
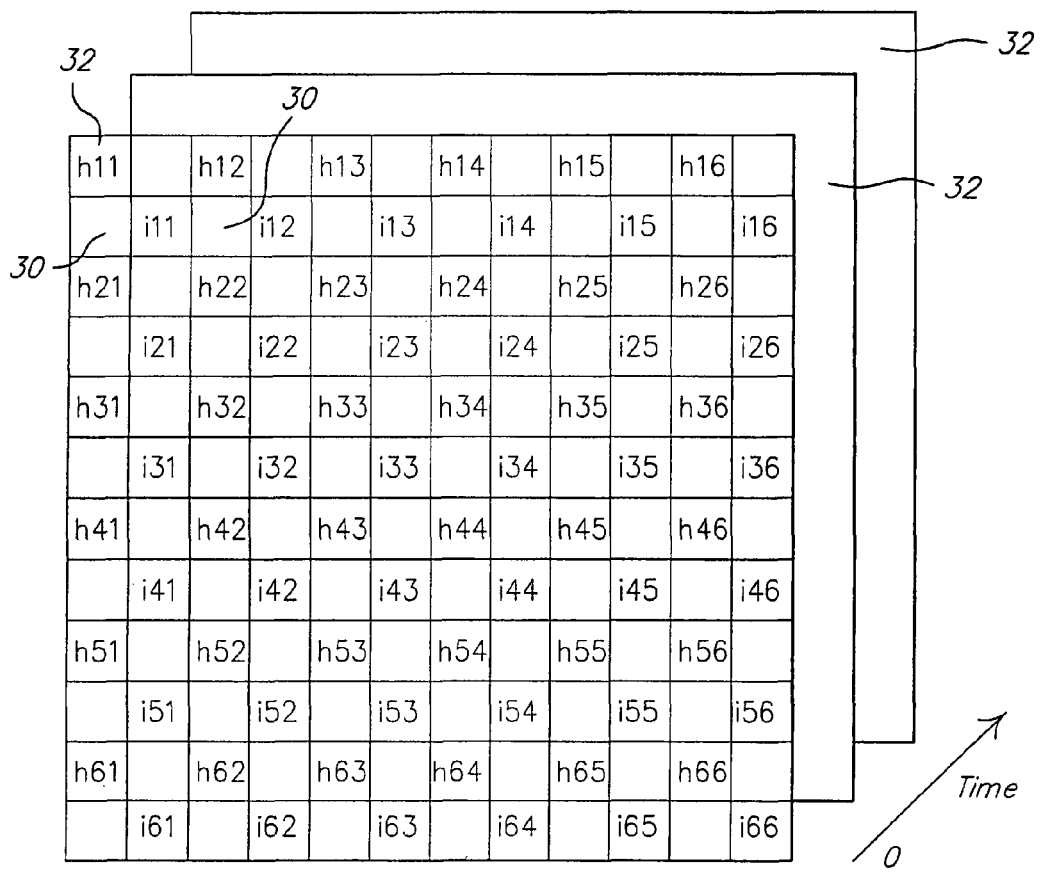
FIG. 10 shows multiple processed images capable of being recombined into video.

As shown in FIG. 10 it should be noted that the processed images from the method of the present invention may be recombined into a video. This video will be based on the images being combined at a predetermined timed interval into a motion picture. Generally, in this case, the method 14 will allow the older image data to be replaced by the newer image data and reprocessed by any known means available under the super resolution image method 14 of the current invention.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method of improving resolution for a color, gray scale, sepia, monochrome or black and white image, said method including the steps of:
    loading a first image;
    creating a first super grid image of said first image;
    loading a second image;
    creating a second super grid image of said second image;
    arranging said first super grid image and said second super grid image into an unprocessed super grid image with a predetermined pattern;
    calculating a pixel value from at least we one pixel values of said first super grid image and at least one pixel value of said second super grid image, each arranged within said unprocessed super grid image;
    inserting said pixel into a super resolution image; and
    displaying said super resolution image on a display.

2. The method of claim 1 wherein said step of creating a super grid image includes inserting blank pixels at predetermined locations.

3. The method of claim 1 wherein said step of arranging further includes the step of alternating between a row of pixels of said first image and then a row of pixels of said second image.

4. The method of claim 3 wherein said unprocessed super image having a blank pixel value between each pixel of said first image and each pixel of said second image.

5. The method of claim 1 wherein said step of calculating includes the use of a linear spline algorithm.

6. The method of claim 5 wherein said step of calculating includes the step of adding two pixels from said first image.

7. The method of claim 6 wherein said step of calculating includes the step of adding two pixels from said second image.

8. The method of claim 7 wherein said step of calculating further includes multiplying said two added pixels of said first image and said second image by a constant.

9. The method of claim 8 wherein said step of multiplying having said contrast equal to ½ (0.5).

10. The method of claim 8 wherein said step of calculating further includes the step of adding said multiplied values to one another.

11. The method of claim 10 wherein said step of calculating is executed for each blank pixel in said unprocessed super grid image.

12. The method of claim 1 wherein said step of calculating includes the step of multiplying at least one of said pixels from said first and second super grid image by a constant.

13. The method of claim 12 wherein said step of multiplying having said constant equal to ¼ (0.25).

14. The method of claim 12 wherein said step of calculating further includes the step of adding said multiplied pixel value to any other of said multiplied pixel values.

15. The method of claim 14 wherein said step of adding includes up to four of said multiplied pixel values.

16. The method of claim 1 wherein said step of displaying is an instantaneous image.

17. The method of claim 1 wherein said step of displaying includes the step of combining at least two processed images into a video based on any known time pattern.

18. The method of claim 1 wherein said step of displaying occurs on computer, server, handheld device, television, mobile phone, or camera device.

19. The method of claim 1 wherein said first image and said second image are similar images.

20. The method of claim 1 wherein said first image and said second image are dissimilar images.

21. The method of claim 1 wherein said first image and said second image are the same image.

22. The method of claim 1 wherein said first image and said second image are videos frames or video fields.

23. The method of claim 1 wherein said step of calculating includes the step of filling in the edge of said super resolution image.

24. A method of controlling a computer or server to enhance image resolution of an image on a display, said method including the steps of:
    loading a first image;
    loading a second image;
    creating a unprocessed super grid image by manipulating said first image and said second image into a predetermined pattern;
    filling in an edge of said unprocessed super grid image;
    calculating values for predetermined pixels in said unprocessed super grid image by processing at least one pixel of said first image with at least one pixel of said second image; and
    displaying a processed super grid image.

25. The method of claim 24 wherein said first image having the:, dimensions m×n pixels and said second image having the dimensions p×q pixels.

26. The method of claim 25 wherein said predetermined pattern having a checkerboard pattern represented by a string alternating between a pixel value and a zero or blank pixel value.

27. The method of claim 26 wherein said unprocessed super grid image having the dimensions 2m×2n.

28. The method of claim 27 wherein in an alternating pattern of length 2n a first row of said unprocessed super grid image having pixels of said first image and a second row of said unprocessed super grid image having pixels of said second image.

29. The method of claim 24 wherein said step of calculating further includes the steps of:
- adding four pixel values to each other, said four pixel values are adjacent to a blank pixel;
- multiplying the sum of said four pixel values by a constant;
- inserting said multiplied pixel value into said blank pixel; and
- repeating calculations until all of said blank pixel values are calculated.

30. The method of claim 29 wherein said constant is ¼ (0.25).

31. The method of claim 24 wherein said processed super grid image is displayed on a computer screen, television, video recorder, camera, phone or handheld PDA.

32. The method of claim 24 wherein said first image and said second image are the same images.

33. The method of claim 24 wherein said first image and said second image are similar images.

34. The method of claim 24 wherein said first image and said second image are dissimilar images.

35. The method of claim 24 wherein said first image and said second image are video frames or video fields.

36. The method of claim 24 wherein said step of displaying recombines said processed super grid images into video based on a time or other predetermined pattern.

* * * * *

UNITED STATES PATENT AND TRADEMARK OFFICE
CERTIFICATE OF CORRECTION

PATENT NO. : 7,796,301 B2  Page 1 of 1
APPLICATION NO. : 11/803884
DATED : September 14, 2010
INVENTOR(S) : Larry John Solecki It is certified that error appears in the above-identified patent and that said Letters Patent is hereby corrected as shown below:

Column 4, Line 28, Please insert -- ( -- before the third entry of the ¼

Column 6, Line 3, Please replace the uppercase -- Y -- with a lowercase -- y --

Column 7, Line 50, Claim 1; Please delete the added word "we" after from at least Column 7, Line 50, Claim 1; Please change the word -- values -- to read -- value -- after one pixel Column 8, Line 62, Claim 25; Please delete the added punctuation ";," before dimension m x n Signed and Sealed this Twenty-third Day of November, 2010

David J. Kappos
*Director of the United States Patent and Trademark Office*